United States Patent [19]
Daly et al.

[11] Patent Number: 5,163,406
[45] Date of Patent: Nov. 17, 1992

[54] INTAKE MANIFOLD/FUEL RAIL

[75] Inventors: Paul D. Daly, Troy; Robert A. McArthur, Waterford, both of Mich.

[73] Assignee: Siemens Automotive L.P., Auburn Hills, Mich.

[21] Appl. No.: 808,310

[22] Filed: Dec. 16, 1991

Related U.S. Application Data

[62] Division of Ser. No. 563,463, Aug. 7, 1990, Pat. No. 5,097,594.

[51] Int. Cl.$^5$ ................. F02M 55/02; F02B 75/18
[52] U.S. Cl. .................... 123/456; 123/468; 123/52 MV
[58] Field of Search ............. 123/52 MV, 456, 468, 123/469, 470, 472, 41.01, 41.82 R, 55 VF, 55 VS, 55 VE, 55 V

[56] References Cited

U.S. PATENT DOCUMENTS

| | | | |
|---|---|---|---|
| 3,400,695 | 9/1968 | Zuruba | 123/41.82 |
| 4,448,159 | 5/1984 | Hidaka et al. | 123/55 VE |
| 4,601,275 | 7/1986 | Weinand | 123/456 |
| 4,686,944 | 8/1987 | Hiraoka et al. | 123/52 MV |
| 4,768,487 | 9/1988 | Yamamoto et al. | 123/468 |
| 4,771,751 | 9/1988 | Haigh et al. | 123/468 |
| 4,776,313 | 10/1988 | Freismuth et al. | 123/468 |
| 4,805,575 | 2/1989 | de Concini et al. | 123/456 |
| 4,844,036 | 7/1989 | Bassler et al. | 123/456 |
| 4,962,735 | 10/1990 | Andreas | 123/52 MV |
| 4,966,120 | 10/1990 | Itoh et al. | 123/456 |
| 4,981,115 | 1/1941 | Okasako et al. | 123/52 MV |
| 5,022,371 | 6/1991 | Daly | 123/468 |
| 5,062,405 | 11/1991 | Daly | 123/456 |

Primary Examiner—E. Rollins Cross
Assistant Examiner—Thomas Moulis
Attorney, Agent, or Firm—George L. Boller; Russel C. Wells

[57] ABSTRACT

A multiple-runner intake manifold is constructed of upper and lower parts that fit together at a joint. The upper manifold is molded thermoplastic, and the lower part is molded phenolic. The lower part contains an integral fuel rail. The lower part contains a portion of each runner. Those portions are formed as separate through-passages during molding of the lower part in the cavity of a multi-part mold. The fuel passages are molded as through-holes some ends of which are subsequently plugged by closures and other ends of which receive fittings.

2 Claims, 11 Drawing Sheets

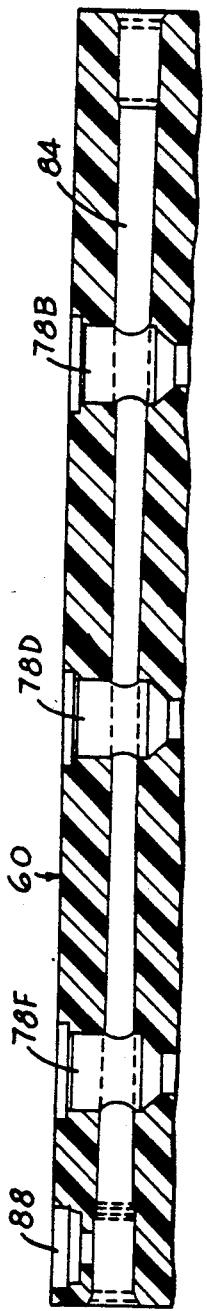
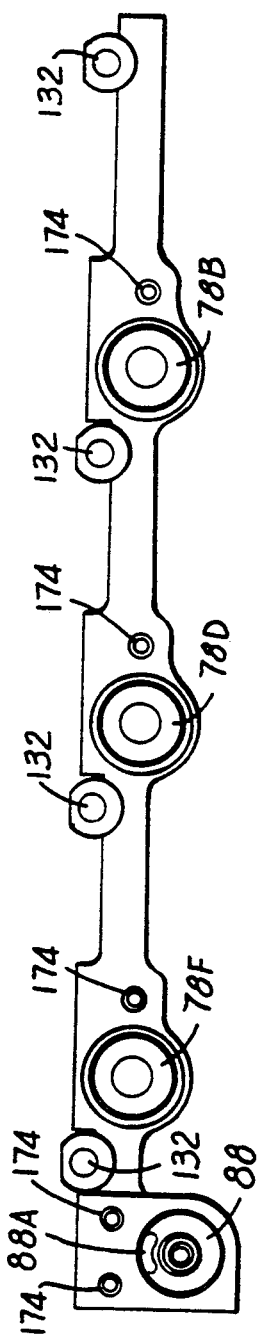
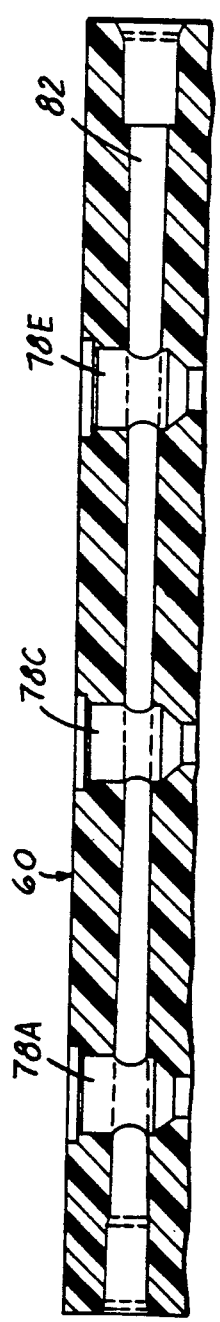
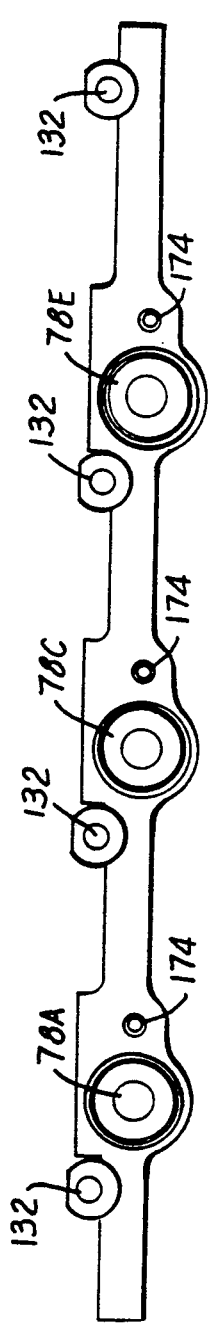

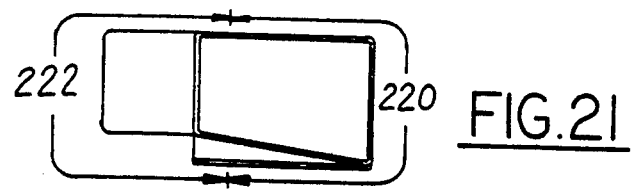
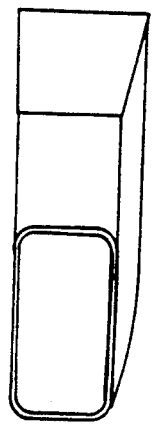
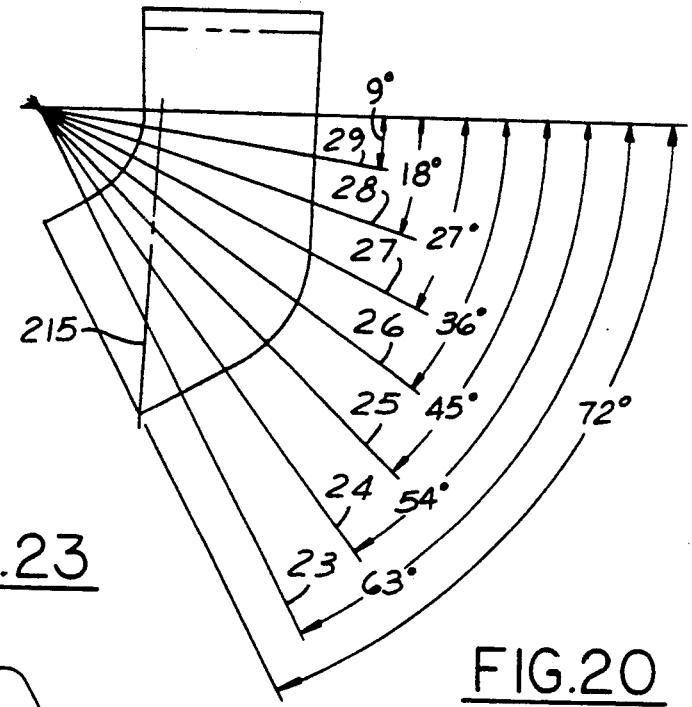
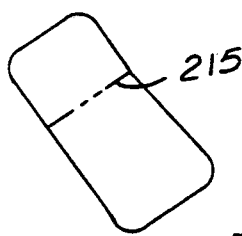
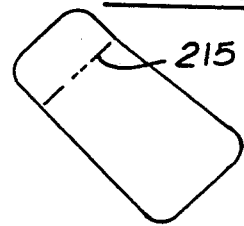
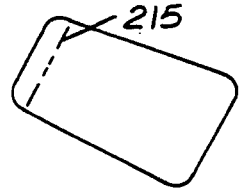
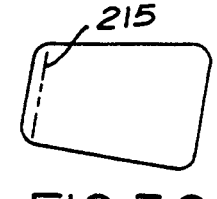

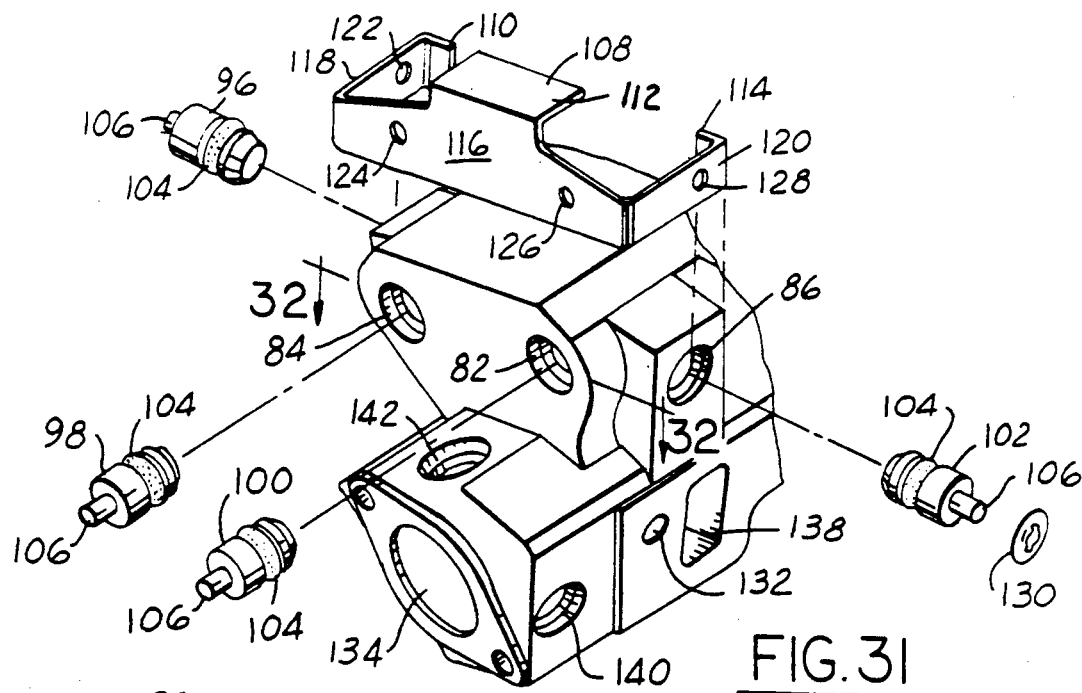
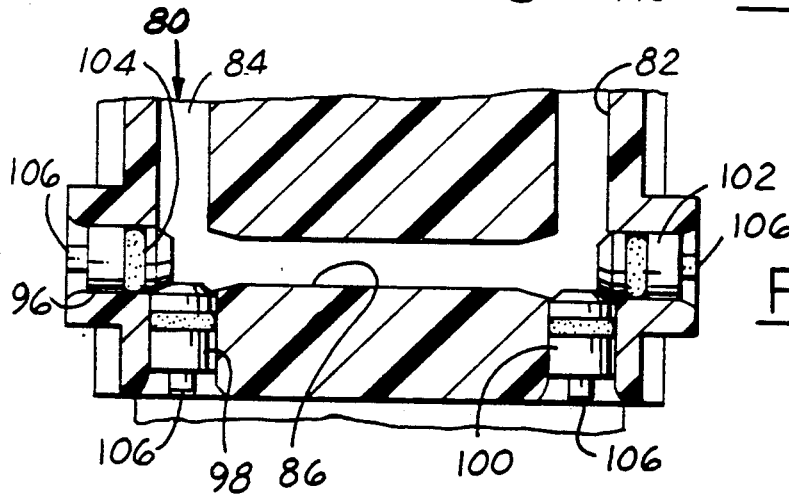
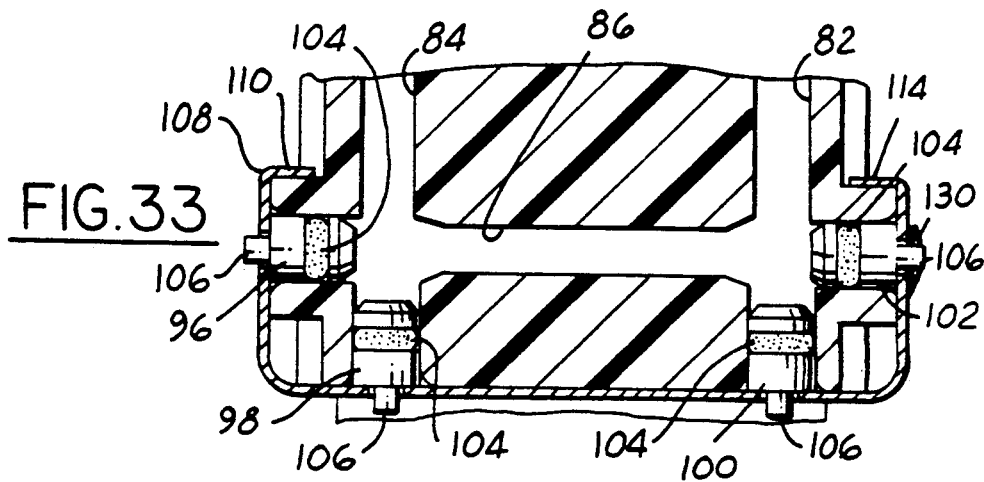

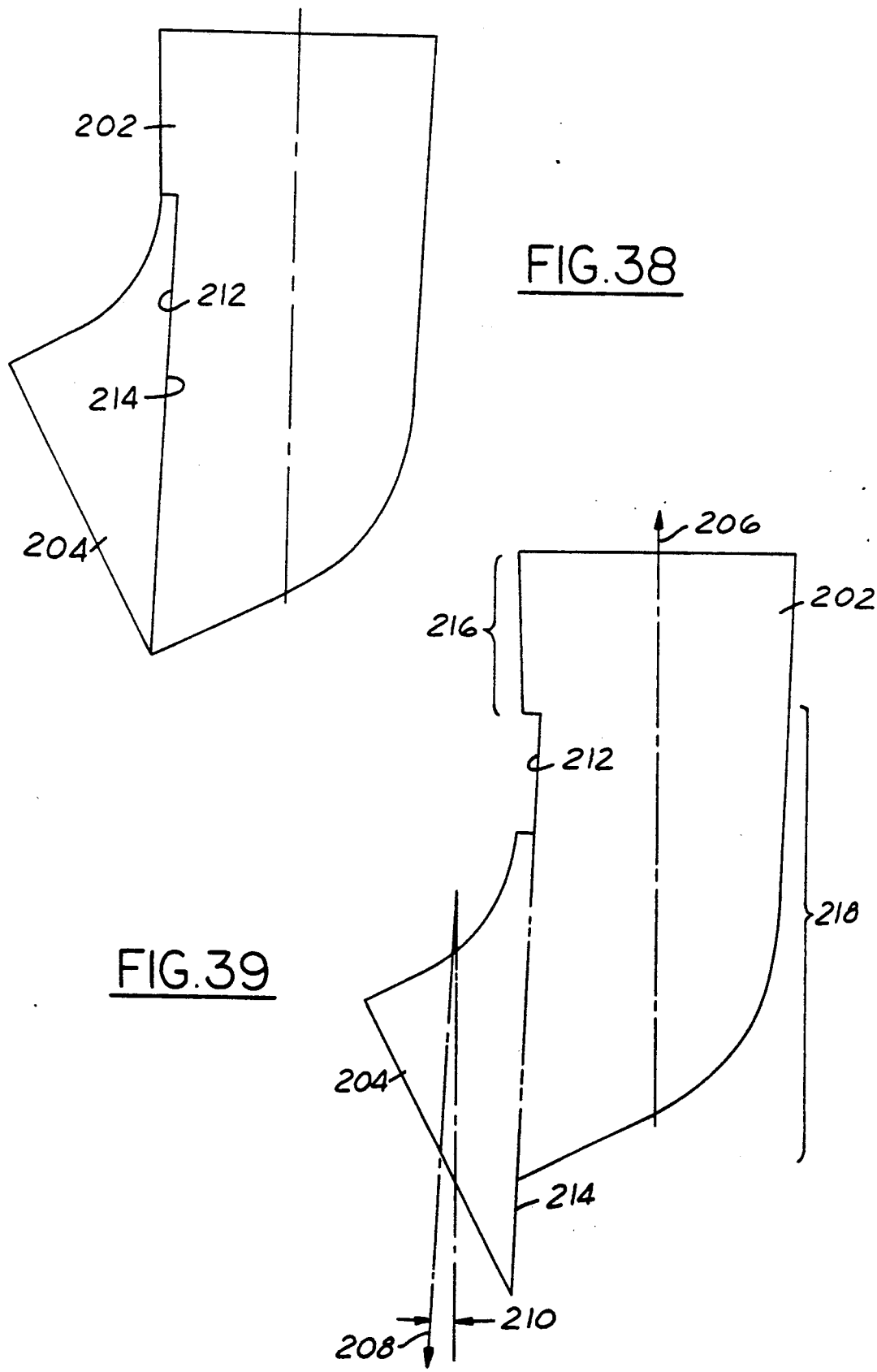

INTAKE MANIFOLD/FUEL RAIL

This application is a division of application Ser. No. 07/563,463, filed Aug. 7, 1990, now U.S. Pat. No. 5,097,594.

FIELD OF THE INVENTION

This invention relates generally to internal combustion engines for automotive vehicles, and in particular it relates to a fuel rail/manifold for an internal combustion engine and to a method for making same.

BACKGROUND AND SUMMARY OF THE INVENTION

One of the numerous steps in the process of designing an automobile involves packaging the engine within the space of the engine compartment that is made available by styling considerations. For example, a low silhouette hood line may be deemed an essential element of a particular model's styling and that imposes a constraint on the vertical extent of the engine compartment. This of course creates a need for a more vertically compact powerplant. At the same time that the powerplant is being dimensionally constrained, it is also required to meet certain performance standards (self- and/or government-imposed) relating to various matters such as fuel economy, tail pipe emissions, horsepower, noise, etc.

While the adoption of electronically controlled fuel managements systems, particularly multi-point injection systems, has enabled automobile manufacturers to comply with certain performance standards, demands from various corners, such as from automotive stylists and product planners, from lawmakers and government regulators, and from the marketplace itself, are almost continually imposing changes on applicable standards, usually in the direction of greater stringency. One of the problems which therefore confronts automotive engineers is how to simultaneously make an engine more compact, quieter, cleaner-burning, more fuel-efficient, and more powerful, without imposing intolerable cost penalties on the product.

An automobile powerplant configuration that is suited for these demands is a transverse-mounted, multi-point fuel-injected V-6 engine with front-wheel drive. The engine's length makes it suitable for transverse mounting, its six cylinders provide smoother running than a four-cylinder engine, and with proper design, including proper fuel and spark management, it can be made clean-burning, fuel-efficient, and powerful.

The present invention relates to a new and unique intake manifold/fuel rail for such an engine, and this intake manifold/fuel rail makes significant contributions to engine performance and compactness.

The invention has a number of different, but interrelated, aspects. Certain ones are peculiar to a V-type engine, while certain others are more universally applicable. Described one way in general terms, the invention relates to a construction for an intake manifold containing an integral fuel rail. The disclosed embodiment is particularly adapted for a V-type engine, comprising a molded-phenolic lower manifold part that both contains an integral fuel rail and cooperates with a mating molded-thermoplastic upper manifold part to form the intake manifold/fuel rail.

One significant feature of the invention relates to the configuration of the fuel passageway structure in the lower manifold part and to methodology for embodying that structure in the part. There are a number of specific aspects to this feature, including inter-relationship of the fuel passageway structure with other structures.

The foregoing, along with still more features, advantages and benefits of the invention, will be seen in the ensuing description and claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 13 is a fragmentary cross-sectional view taken generally in the direction of arrows 13—13 in FIG. 4.

FIG. 14 is a full fragmentary top view of FIG. 13.

FIG. 15 is a fragmentary cross-sectional view taken generally in the direction of arrows 15—15 in FIG. 4.

FIG. 16 is a full fragmentary top view of FIG. 15.

FIG. 20 is a diagrammatic view illustrating certain details concerning a representative combustion airflow through-passage in the lower manifold part.

FIG. 21 is a top view of FIG. 20.

FIG. 22 is a left elevational view of FIG. 20.

FIGS. 23 through 30 respectively are respective transverse cross-sectional representations of the representative passageway of FIG. 20 as taken along the correspondingly numbered lines in FIG. 20.

FIG. 31 is a fragmentary perspective view of the near longitudinal end portion of the manifold part depicted in FIG. 1 and incorporating additional structure.

FIG. 32 is an enlarged fragmentary cross-sectional view taken generally in the direction of arrows 32—32 in FIG. 1 and showing a particular stage of the assembly process.

FIG. 33 is a view like FIG. 32 but illustrating a further stage.

FIG. 38 is a view similar to that of FIG. 20 but illustrating the mated condition of two core parts that are used to form the through-passage of FIG. 20, said core parts being elements of a mold that is used to fabricate the lower manifold part.

FIG. 39 is a view in the same direction as the view of FIG. 38 but illustrating the two core parts in the process of being separated from each other.

DESCRIPTION OF THE PREFERRED EMBODIMENT

Figure 1:
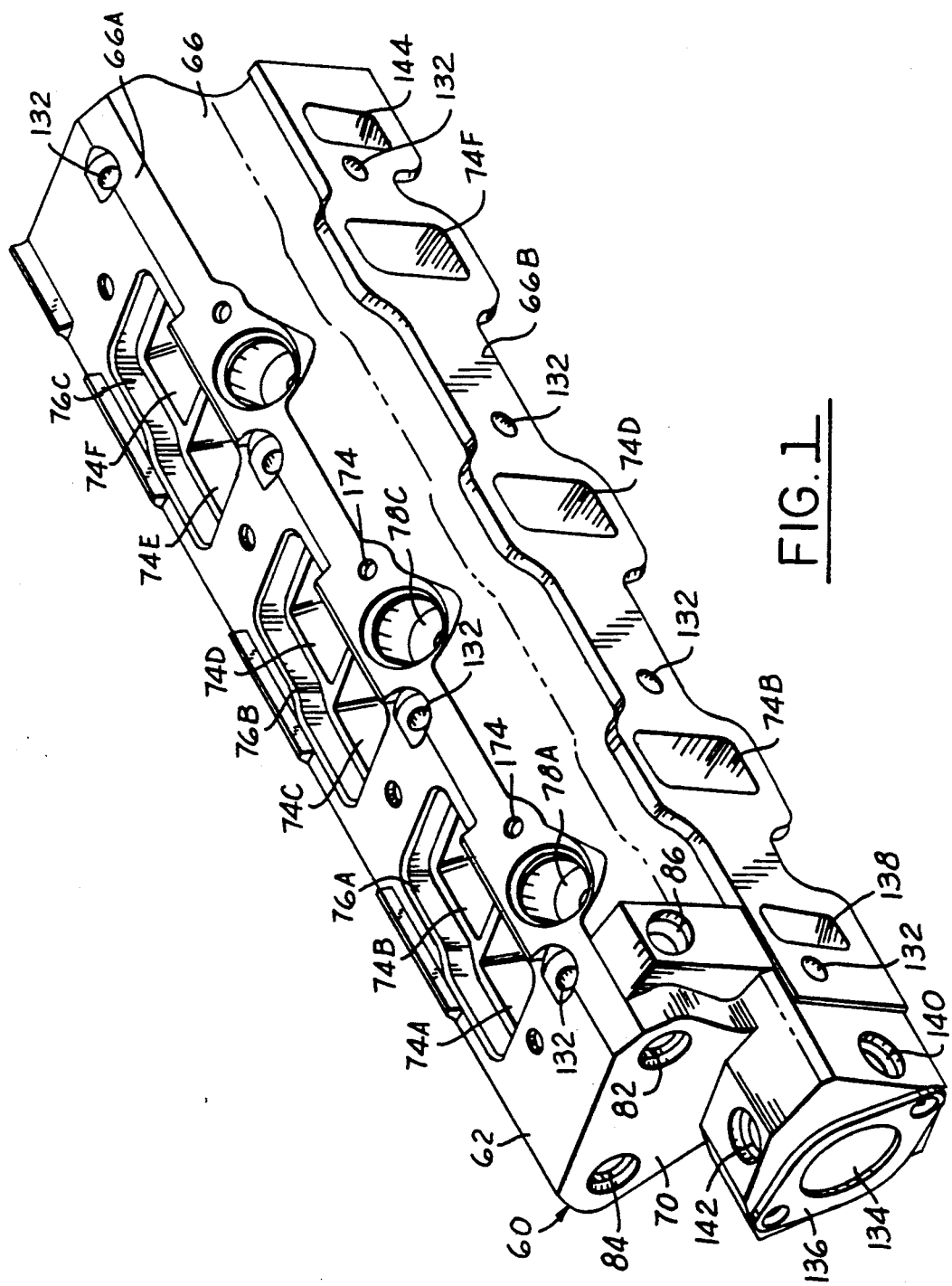
FIG. 1 is a perspective view of the lower manifold part by itself.
Figure 2:
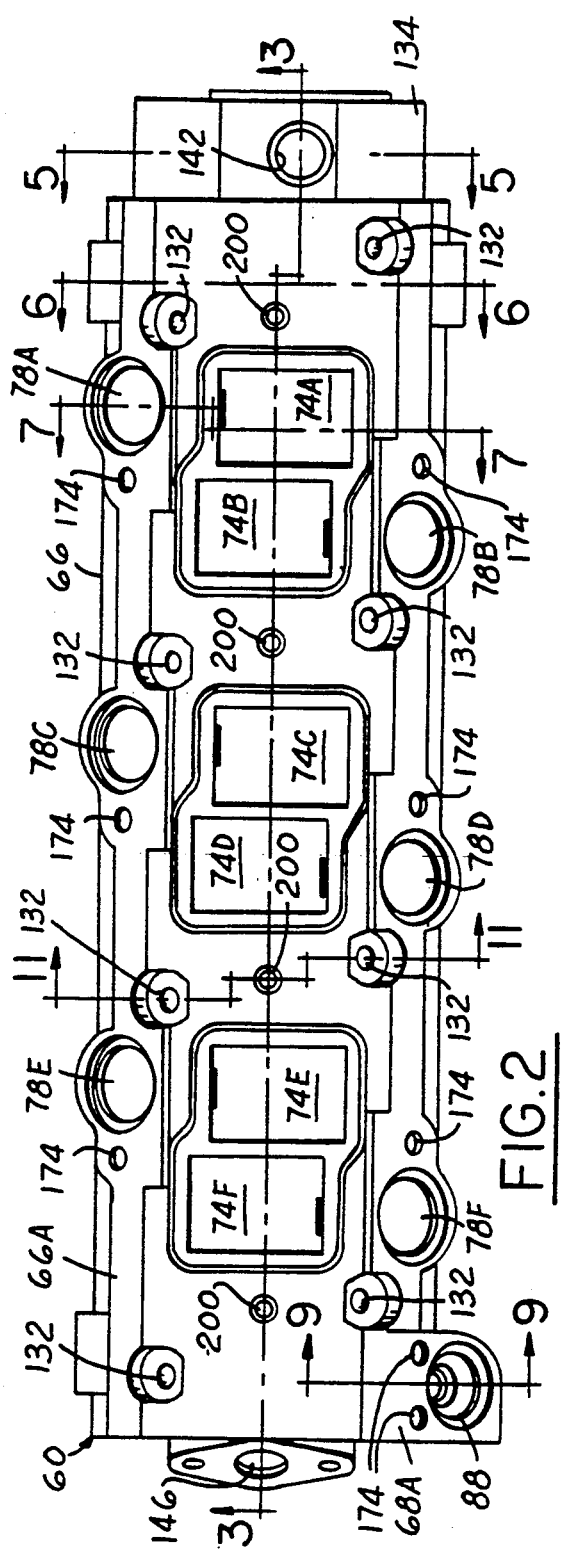
FIG. 2 is a top plan view of the lower manifold part.

The lower manifold part shown in the drawing is identified by the general reference numeral 60 and comprises a molded plastic body, preferably a molded phenolic. Part 60 is shaped to fit onto the top of a V-6 engine between the two heads that cover respective banks of cylinders that form the respective halves of the V.

Part 60 may be considered as an elongate, generally six-sided block comprising a top exterior face 62, a bottom exterior face 64, side exterior faces 66 and 68, and end exterior faces 70 and 72. Side faces 66 and 68 comprise respective upper side face portions 66A, 68A and respective lower side face portions 66B, 68B. Upper side face portions 66A, 68A are canted laterally outwardly and downwardly from top face 62. Lower side face portions 66B, 68B are canted laterally outwardly and upwardly from bottom face 64.

Figure 36:
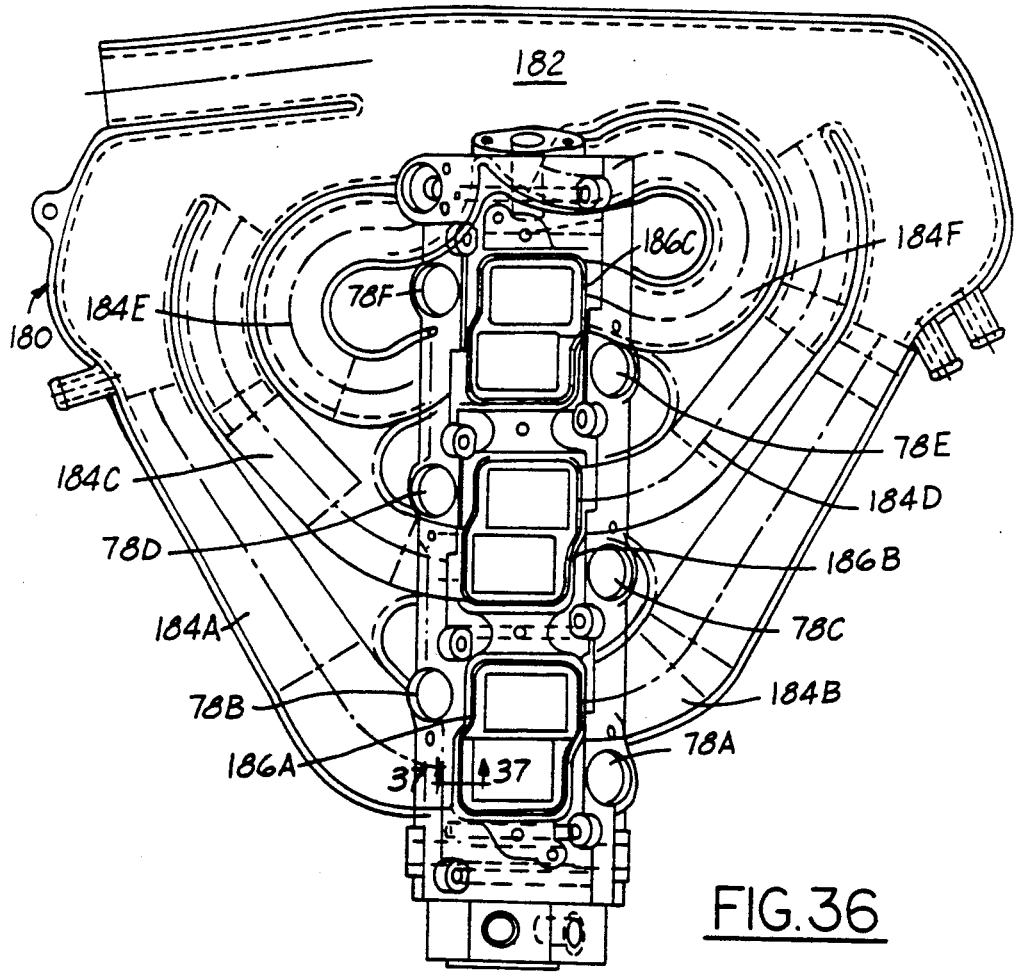
FIG. 36 is a top view of FIG. 35.
Figure 35:
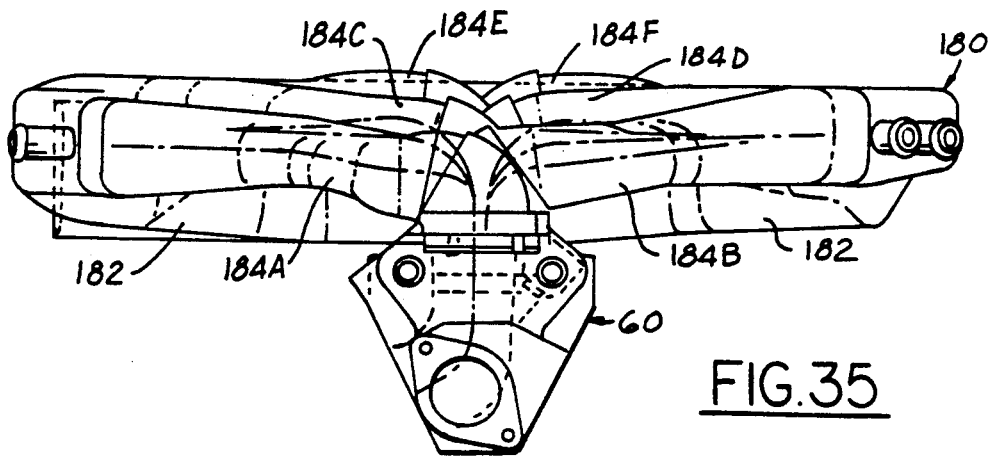
FIG. 35 is a view in the same direction as the view of FIG. 4 illustrating the upper manifold part mated with the lower manifold part.

Part 60 comprises six individual combustion air through-passages 74A, 74B, 74C, 74D, 74E, 74F. Each through-passage 74A-74F forms part of a respective runner for a respective cylinder of a V-6 engine with which part 60 is used. (Additional details of the engine and runners will be explained in conjunction with the descriptions of FIGS. 19, 35, and 36.) Each through-passage 74A-74F has an inlet at top face 62 and an outlet at a respective one of the lower side face portions 66B, 68B of the respective side faces 66, 68. The outlets of through-passages 74A, 74C and 74E are at lower side face portion 68B while those of through-passages 74B, 74D, 74F are at lower side face portion 66B.

Figure 3:
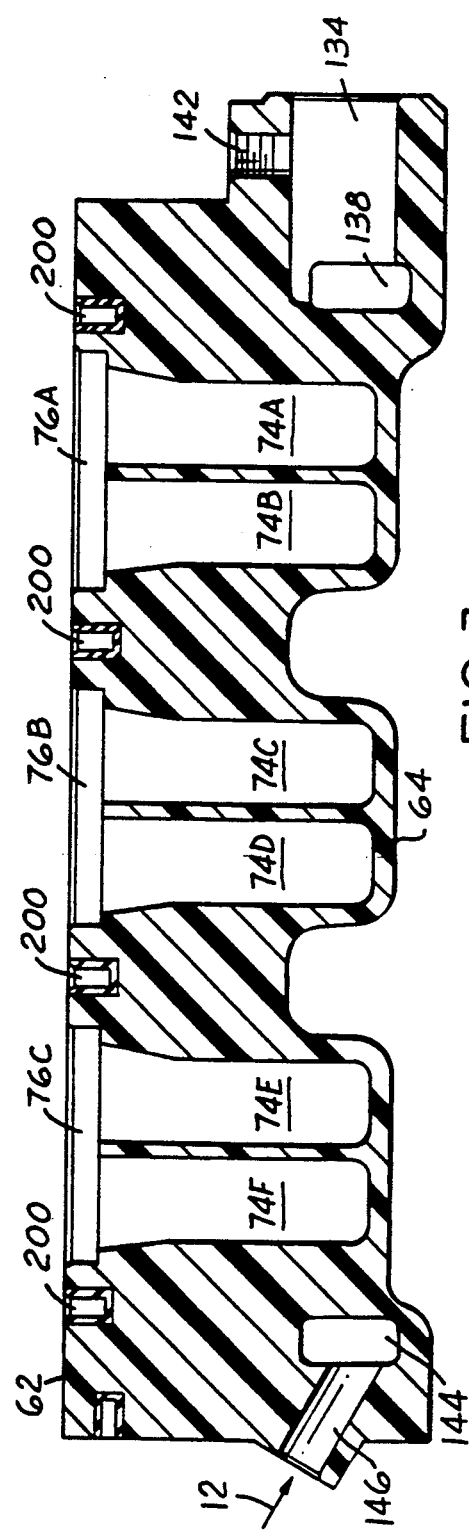
FIG. 3 is a vertical longitudinal sectional view taken generally in the direction of arrows 3—3 in FIG. 2.
Figure 4:
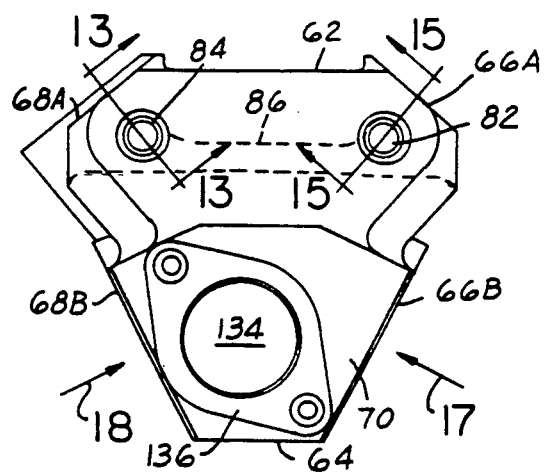
FIG. 4 is a full right elevational view of FIG. 3.
Figure 5:
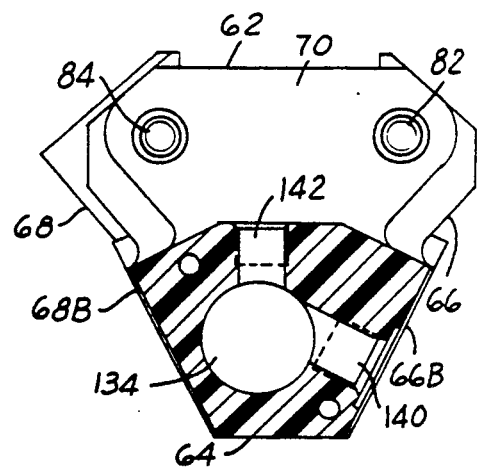
FIG. 5 is a transverse cross-sectional view taken generally in the direction of arrows 5—5 in FIG. 2.
Figure 7:
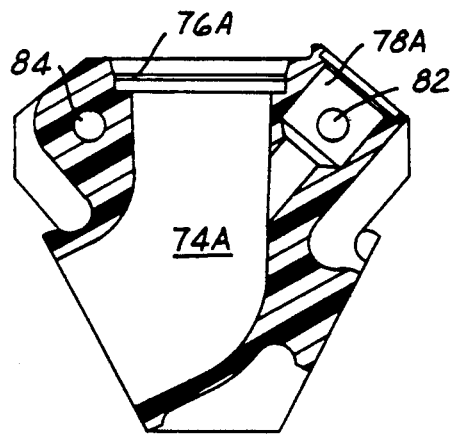
FIG. 7 is a transverse cross-sectional view taken generally in the direction of arrows 7—7 in FIG. 2.

As can be understood from consideration of FIG. 7, each through-passage 74A-74F is in the shape of an elbow. As can be seen in FIGS. 1, 2, 17 and 18, the inlets and outlets of each through-passage 74A-74F are generally rectangular in shape. The transverse cross-sectional shape of each through-passage is also generally rectangular as can be seen from consideration of FIGS. 23-30. It can be seen in FIGS. 1-3 that the inlets of through-passages 74A, 74B are contained within a shallow depression 76A in top face 62, the inlets of through-passages 74C, 74D are within a common depression 76B in face 62, and the inlets of through-passages 74E, 74F are within a common depression 76C in top face 62. It can be further seen in FIGS. 1 and 2 that the inlets of through-passages 76A, 76C, 76E are in mutual alignment lengthwise of part 60 but are slightly laterally offset to one lateral side while the inlets of through-passages 74B, 74D, 74F are in mutual alignment lengthwise of the part but slightly laterally offset to the opposite lateral side.

Figure 19:
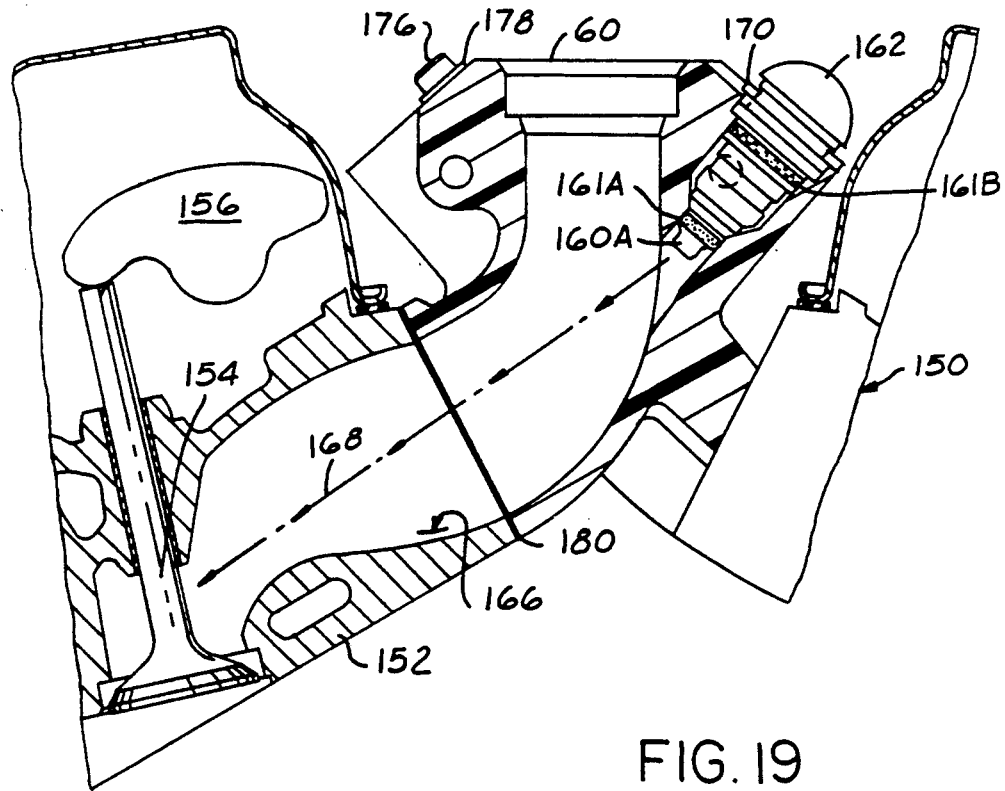
FIG. 19 is a fragmentary transverse cross-sectional view illustrating the lower manifold part mounted on an engine.

Part 60 comprises six cylindrical sockets 78A, 78B, 78C, 78D, 78E, 78F, each of which is adapted to receive a respective electromagnetic fuel injector. (The installation of a representative fuel injector in a socket is illustrated by FIG. 19 and will be described in connection with the ensuing discussion of that particular drawing figure.) Sockets 78A, 78C, 78E constitute a first bank of sockets disposed in one lateral half of part 60 while sockets 78B, 78D, 78F constitute a second bank of sockets that are disposed in the opposite lateral half of part 60. Each socket of the first bank is open at upper side face portion 66A while each socket of the second bank is open at upper side face portion 68A. The axis of each socket is straight and extends downwardly and laterally inwardly from its corresponding upper side face portion so that the socket's sidewall is inclined from the vertical. Each socket is open to the corresponding through-passageway 74A-F internally of part 60. As can be understood from consideration of FIG. 7, at least a majority of the volume of each socket is disposed in the lateral half of part 60 that is opposite the half containing the outlet of the respective through-passage 74A-74F. FIG. 7 shows the entirety of the socket to be in the lateral half of part 60 that is opposite the lateral half that contains the outlet of the respective through-passage.

Part 60 further comprises fuel passageway structure for placing the six sockets in fluid communication with an external fuel supply for the ingress and egress of liquid fuel to and from said sockets so as to make a supply of fuel continuously available to fuel injectors that are disposed in the sockets when the part is functionally installed on an engine. The fuel passageway structure 80 comprises: a first circular through-hole 82 extending longitudinally lengthwise of part 60; a second through-hole 84 extending longitudinally lengthwise through part 60; and a transverse through-hole 86 that extends transversely through part 60 and intercepts both through-holes 82 and 84 at the near lengthwise end of the part as viewed in FIG. 1. Further details of the three through-holes 82, 84 and 86 are seen in FIGS. 6, 13, 15, 32, and 33.

Figure 6:
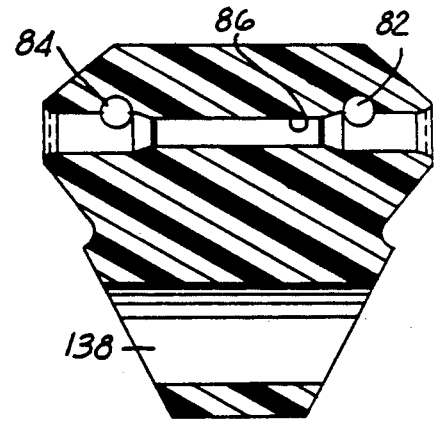
FIG. 6 is a transverse cross-sectional view taken generally in the direction of arrows 6—6 in FIG. 2.

Through-holes 82 and 84 are parallel and disposed in respective lateral halves of part 60. Through-hole 82 intercepts the sidewalls of sockets 78A, 78C, 78E while through-hole 84 intercepts the sidewalls of sockets 78B, 78D, 78F. The interceptions of the sockets' sidewalls occur in a generally chordal manner, meaning that the through-hole axis lies on a chord of an imaginary circle that is coincident with the socket sidewall. As can be seen in FIG. 7, such a chord lies in that half of socket 78A that is farther from through-passage 74A than is the other half of the socket. An alternate form of interception is presented in FIG. 19 which shows the chord to be in the half of the socket that is nearer the corresponding through-passage. In other words, the location of each such alternate form of interception occurs laterally inwardly of an imaginary plane that passes through the socket's axis in the same direction as that along which the corresponding through-hole 82, 84 intercepts the socket. As can be seen in FIG. 6, the axis of through-hole 86 does not intersect the axes of through-holes 82 and 84, but rather is disposed below them.

Figure 8:
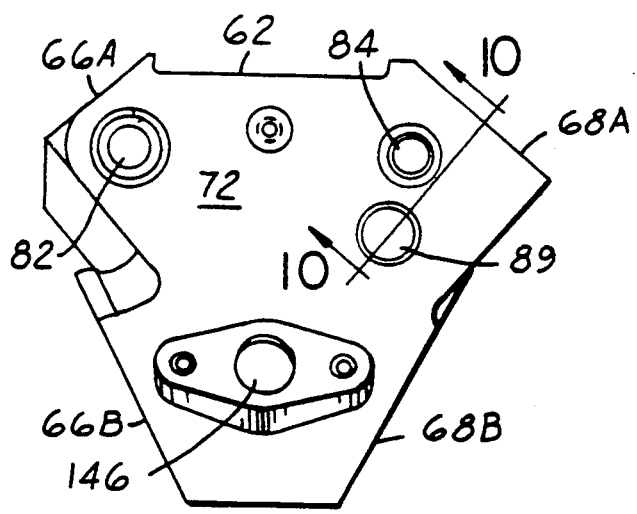
FIG. 8 is a full left elevational view of FIG. 3.
Figure 9:
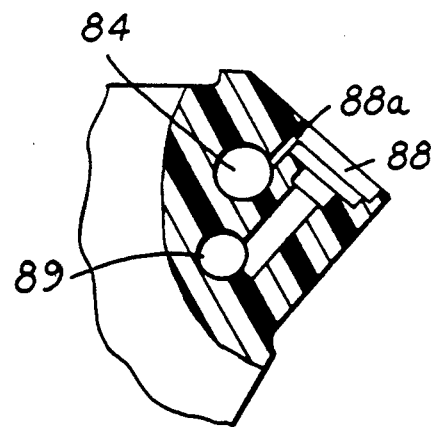
FIG. 9 is a fragmentary transverse cross-sectional view taken generally in the direction of arrows 9—9 in FIG. 2.
Figure 11:
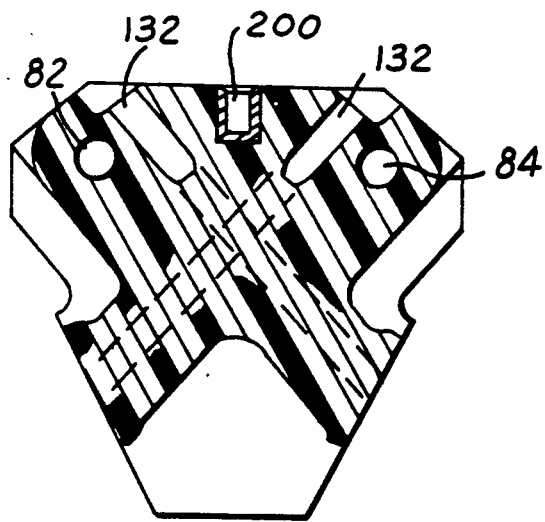
FIG. 11 is a transverse cross-sectional view taken generally in the direction of arrows 11—11 in FIG. 2.
Figure 10:
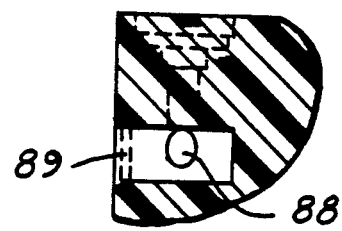
FIG. 10 is a fragmentary cross-sectional view taken generally in the direction of arrows 10—10 in FIG. 8.
Figure 12:
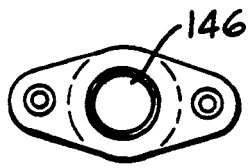
FIG. 12 is a fragmentary view looking in the direction of arrow 12 in FIG. 3.
Figure 17:
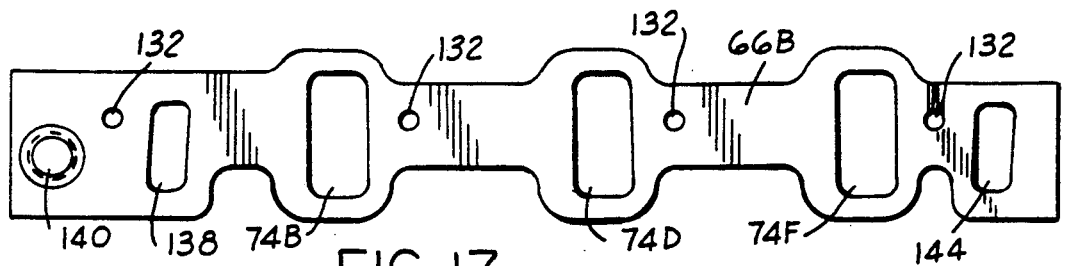
FIG. 17 is a partial view looking in the direction of arrow 17 in FIG. 4.
Figure 18:
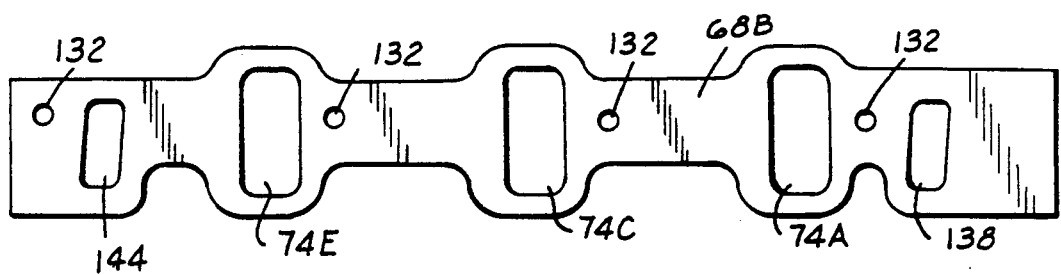
FIG. 18 is a partial view looking in the direction of arrow 18 in FIG. 4.

Also in communication with through-hole 84 adjacent the near end thereof as viewed in FIG. 1 is a multi-shouldered socket 88 that is adapted to receive a fuel pressure regulator (not shown). As seen from consideration of FIGS. 2, 8, 9, 10, 13, and 14, socket 88 is open at upper side face portion 68A and extends into communication with through-hole 84 via an arcuate slot portion 88a of the socket. There is a blind hole 89 in end face 72 that in FIG. 8 can be seen below and laterally inboard of through-hole 84. The innermost end of socket 88 intercepts hole 89 (FIG. 9). The end of through-hole 84 at end face 72 is closed by a closure 91.

When a fuel pressure regulator is inserted into socket 88 via the open exterior end thereof and properly seated in a sealed manner in the socket, fuel from through-hole 84 cannot leak past the installed pressure regulator. Of course, the electromagnetic fuel injectors too are installed in their respective sockets in sealed manner so that liquid fuel will not leak past them. The fuel pressure regulator provides conventional pressure regulation of liquid fuel in the through-holes 82, 86, and 84 of fuel passageway structure 80. The direction of flow through the regulator is from through-hole 84, through slot 88A to the regulator's inlet, through the regulator exiting via the innermost end of socket 88 to hole 89. The regulator mounting and communication of the regulator to the fuel passageway structure is like that disclosed in commonly assigned allowed U.S. Ser. No. 07/250,056, filed Sep. 28, 1988 in the names of Mahnke and Hornby.

Figure 34:
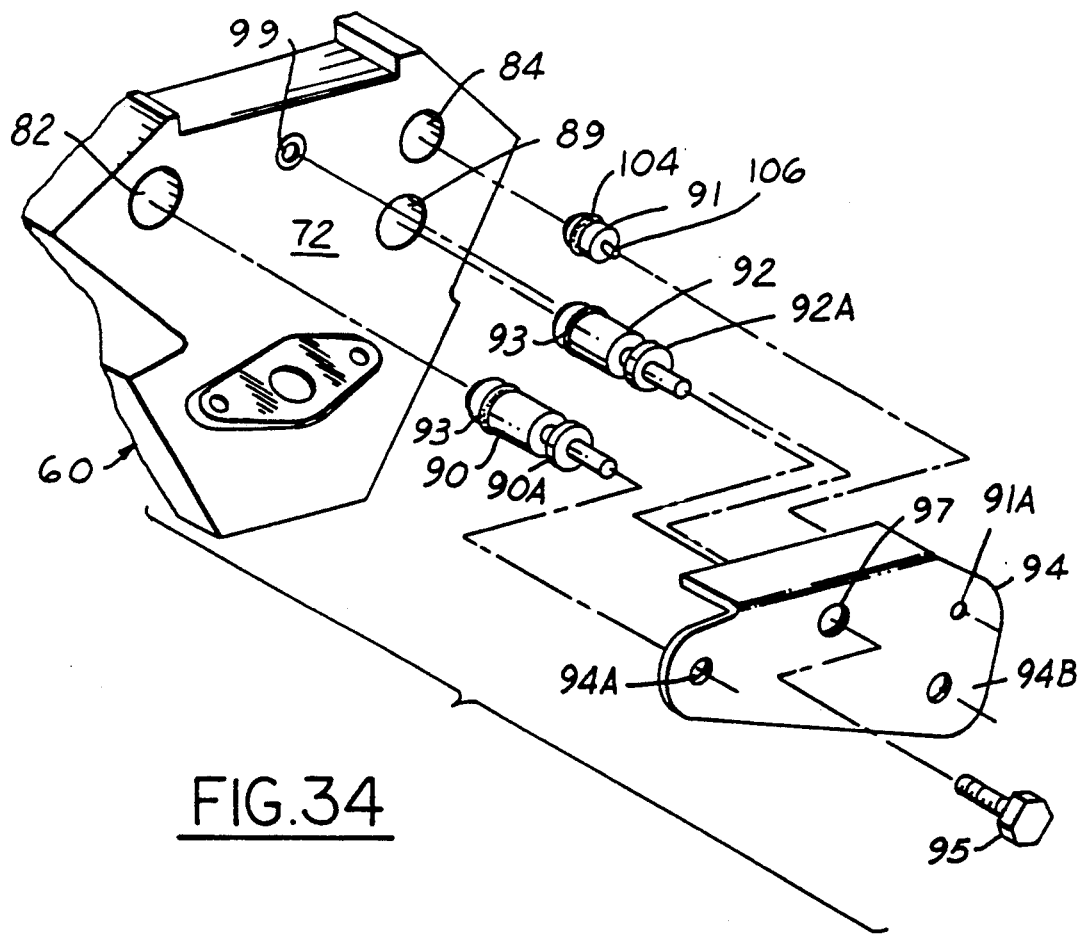
FIG. 34 is a fragmentary perspective view of the far end of the lower manifold part of FIG. 1 viewed from a different direction.

Refer also to FIG. 34. With part 60 functionally installed on an engine, a fuel inlet fitting 90 that has been inserted into the end of through-hole 82 that is at end face 72 provides for the ingress of liquid fuel into the fuel passageway structure. End face 72 also contains a return fitting 92 inserted into blind hole 89. Fuel egresses from the fuel passageway structure via the return fitting. The two fittings 90 and 92 contain respective o-ring seals 93 for sealing to the holes, and they are held in place by means of a metal bracket 94 that is fastened to part 60 in the manner depicted by FIG. 34 wherein a screw 95 is passed through a corresponding clearance hole 97 in the bracket and threaded into a corresponding hole 99 in part 60. The latter hole may be in a metal insert insert-molded into part 60. The bracket has holes 94A, 94B whose respective margins bear against respective flanges 90A, 92B of the fittings to hold the flanges against end face 72.

In addition to the closure of one end of through-hole 84 by closure 91, it is also necessary that both ends of through-hole 86 be closed and that the near ends (as viewed in FIG. 1) of through-holes 82 and 84 be closed so that fuel will not escape via these ends of the through-holes. FIGS. 32 and 33 illustrate the closure of four ends of the through-holes by four respective closures 96, 98, 100, 102. Each closure has a general circular cylindrical body with a tapered lead at one end to facilitate insertion of each closure into the end of the corresponding through-hole via that open end of the through-hole. A tip 106 projects coaxially from the opposite end of each closure. An elastomeric o-ring 104 is seated in a circular groove extending around the outside of each closure's body so as to provide full sealing contact with the wall of the corresponding though-hole. Closure 91 is like closures 96, 98, 100, 102. The manner in which the closures are assembled to part 60 will now be described with reference to FIGS. 31–34.

The closures are inserted into the respective through-holes so that the tips 106 do not protrude from the through-holes beyond the surrounding exterior surface of part 60. This condition is shown in FIG. 32 for closures 96, 98, 100, 102. Next, a bracket 108 that is shaped for a cooperative fit onto part 60 is fitted onto the part so that respective portions of bracket 108 overlie the respective ends of the through-holes containing the respective closures. Bracket 108 is shaped to include tabs or flanges such as 110, 112, 114 that aid in accurately locating the bracket on part 60.

A transversely extending portion 116 of the bracket overlies closures 98 and 100 while respective side portions 118, 120 respectively overlie closures 96 and 102. The bracket contains four circular holes 122, 124, 126, 128 located such that with the bracket accurately located on part 60, each hole coaxially aligns with the tip 106 of a respective closure.

With the fuel pressure regulator, the six fuel injectors, inlet fitting 90, and return fitting 92 have been properly installed, fuel passageway structure 80 is completely sealed. The sole external access is via the inlet and return fittings which provide for the intended communication of the fuel passageway structure with the fuel supply and return when part 60 is functioning on an engine. The flow path through the fuel passageway structure is from inlet fitting 90, the circuit through the fuel passageway structure is from inlet fitting 90, through through-hole 82, through through-hole 86, through through-hole 84, through slot 88A, through the fuel pressure regulator, and out of the innermost end of socket 88 to hole 89, and through hole 89 to return fitting 92.

Before its assembly to an engine, it is a typical practice to test a fuel rail by connecting the inlet and return fittings to a test source. A typical test source comprises a pressurized supply of compressed nitrogen connected to the inlet fitting and a sensor means connected to the return fitting. A fuel rail which has been properly assembled and does not leak will conduct flow from the inlet fitting to the return fitting in a manner which can be appropriately detected by the sensor means that is connected to the return fitting. That the fuel rail is functioning properly is detected by the existence of proper pressure and flow readings at the return fitting.

The application of this test procedure to an assembly embodying the present invention will cause the closures 96, 98, 100, 102 to be displaced outwardly from the positions illustrated in FIG. 32 to the positions illustrated in FIG. 33. From comparison of these two Figs., it can be seen that the tips 106 of each closure have passed through the corresponding holed 122, 124, 126, 128 and that the shoulder of each closure at the proximal end of its tip 106 is abutting a marginal portion of the bracket surrounding each such bracket hole. Thus, the bracket forms a keeper that captures the closures such that each closure is maintained to close off the corresponding end of the corresponding through-hole. Closure 91 is engaged in like manner with bracket 94, the closure's tip 96 protruding through a corresponding hole 91A in the bracket. So long as the part 60 is not subjected to a condition where the pressure in the fuel passage structure would be at least a certain amount less than the pressure exerted on the opposite end of each closure, the closures will remain in the positions illustrated in FIG. 33 due to the presence of sufficient contact friction of the respective o-rings with the through-holes' walls. It may be desirable, however, to assure the complete capture of each closure with the bracket by pressing an annular device, such as a pushnut 130, onto the distal end of each tip 106 as illustrated by FIG. 33 for closure 102 only. The pushnuts are preferably applied to the tips while the fuel passageway structure continues to be pressurized by the compressed test gas.

Part 60 further comprises two banks of bolt holes each bearing the reference number 132. There are four bolt holes 132 associated with the first bank of three sockets and a like number of bolt holes associated with the second bank of three sockets. The axes of the four bolt holes that are associated with the first bank of sockets are parallel with the axes of those sockets. The axes of the bolt holes associated with the second bank of sockets are parallel with the axes of those sockets. Each bolt hole extends through part 60 in a generally diagonal manner. The upper end of each bolt hole can be considered to be located essentially at the junction of top face 62 with the corresponding upper side face portion 66A, 68A. The opposite end of each bolt hole is located in the opposite lateral half of part 60 from the lateral half that contains the upper end of the bolt hole. In FIG. 1 it can be seen that the lower ends of the bolt holes that are associated with the far bank of sockets are located in lower side face portion 66B. The lower ends of the bolt holes associated with the near bank of sockets are located in the other lower side face portion 68B. The bolt holes are arranged in a pattern so that none intersects a socket, a through-passage, a through-hole, another bolt hole, or any other hole in part 60.

Further constructional aspects of part 60 relate to the incorporation of certain coolant passage structure in the part. A conventional internal combustion engine cooling system comprises a thermostat that functions to control the circulation of coolant to the radiator. The near axial end of part 60 as viewed in FIG. 1 is provided with an enclosure 134 adapted to contain a thermostat (not shown). The reader will recognize the conventional configuration for the thermostat mounting 136. Axially opposite the thermostat mounting, enclosure 134 is intercepted by a transverse coolant port 138 that mates with ports (not shown) in the engine cylinder heads when part 60 is functionally installed on an engine. A bypass port 140 transversely intersects the enclosure forwardly of coolant port 138 as referenced to FIG. 1. The incorporation of enclosure 134 into part 60 also provides for the opportunity of having, in the top wall of the enclosure, a hole 142 with a molded-in internal thread which can accept a sensor (not shown) that reads coolant temperature. The sensor has a male thread complementary to hole 142 that allows the sensor to be screwed into the enclosure and sealed by means of suitable sealing provisions. The fabrication of part 60 by a molding process enables the threaded hole 142 to be created during the molding process.

The far end of part 60 as viewed in FIG. 1 contains a transverse coolant port 144 extending into the part from the lower side face portions 66B, 68B to internally intercept a port 146 (see FIG. 3) that is adapted to be connected to the core of a heater for the automobile's passenger compartment (not shown).

FIG. 19 illustrates part 60 assembled to an engine 150. The engine comprises cylinder heads 152 on opposite sides. Each cylinder head is fastened to one side of the engine block to close the ends of the combustion cylinders that are contained in the block. For each of its cylinders, each cylinder head comprises an intake valve 154 that is operated in timed relation to the reciprocation of the piston in the corresponding cylinder to open and close the combustion chamber space of the cylinder to combustion air that passes through a corresponding runner of the engine's air intake system. Each runner includes a respective through-passage 74A-74F. When the intake valve is operated open by the associated rocker arm 156 of the engine valve train mechanism, air passes through the corresponding runner and past the valve into the combustion chamber space.

Entrained in the airflow into each cylinder is a controlled amount of fuel that has been sprayed from the tip end 160A of an electromagnetic fuel injector 160 that is disposed in the corresponding socket 78A-78F. The bore of each socket is stepped for receiving and seating the injector. The injector is inserted, tip end first, into the socket via the socket opening that is at the corresponding upper side face portion 66A, 68A.

The illustrated injector 160 is of the side-feed type. Two o-ring seals 161A, 161B are disposed in respective grooves around the outside of the injector body so that when the injector is seated in the socket, an annular fuel space is defined cooperatively by the injector and the socket between the two o-ring seals. This annular fuel space surrounds the inlet opening(s) of the injector. It is this annular fuel space that is intercepted by the corresponding through-hole 82, 84. In this way, pressurized liquid fuel is continuously available to each injector so that when the normally closed injector is opened by an electric current pulse delivered via an electrical connector 162 mated to electrical terminal structure at the exterior end of the injector, fuel is sprayed from the injector tip end into the corresponding through-passage 74A-74F for entrainment with combustion air.

Although a projection of the longitudinal axis of the injector in FIG. 19 would hit the wall of the cylinder head air passage at a location indicated by the reference numeral 166, the injector may be advantageously provided with an angled spray tip so that jets of fuel which are sprayed from the injector travel in the direction indicated by the arrows 168 to impact the valve stem, to the extent that the fuel is not atomized into the airstream beforehand. If the valve stem is significantly hotter than the sidewall of the runner passage, the direction of the fuel injection onto the valve stem will enhance fuel atomization.

It is also to be observed in FIG. 19 that the injector is retained on the part 60 by means of a metal retention clip 170 which is fastened to the part by means of a screw (not shown) which is passed through a suitable clearance hole in the clip and threaded into a hole 174 in part 60 immediately adjacent to the socket (see FIG. 1 for the location of the hole 174). There are also two holes 174 for securing the pressure regulator to part 60.

From FIG. 19, it can be seen that fastening bolts 176 have been passed through the bolt holes 132 and threaded into threaded holes in the cylinder heads to secure part 60 on the engine. Conventional assembly practices may include a bearing washer 178 between the bolt head and the surface of part 60 around each hole 132. Gaskets 180, also seen in FIG. 19, are disposed between side face portions 66B, 68B and the cylinder heads.

Figure 37:
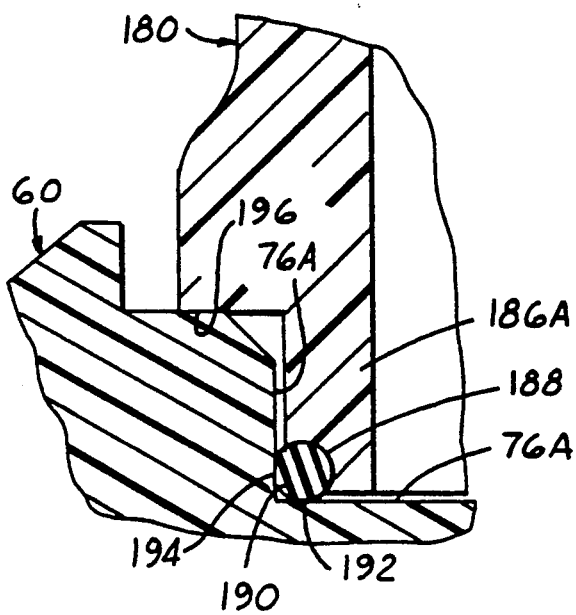
FIG. 37 is a fragmentary cross-sectional view taken generally in the direction of arrows 37—37 in FIG. 36 and enlarged.

After part 60 has been assembled to the engine in the manner described with reference to and illustrated by FIG. 19, upper manifold part 180 can be attached to complete the manifold assembly. The reader's attention is directed to FIGS. 35-37 which illustrate certain details. The upper manifold part is a molded thermoplastic material shaped to comprise an inlet plenum zone, 182 generally, from which six individual runners 184A, 184B, 184C, 184D, 184E, 184F extend to the respective through-passages 74A-74F. The outlets of the two runners 184A, 184B are bounded by a wall 186A; the outlets of runners 184C, 184D by a wall 186B; and the outlets of runners 184E, 184F by a wall 186C. The respective walls 186A, 186B, 186C are arranged to telescopically fit into the respective depressions 76A, 76B, 76C in the manner represented in greater detail by FIG. 37.

The outer corner edge of each wall 186A, 186B, 186C comprises an endless groove 188. A suitable elastomeric seal 190 is fitted to this groove prior to assembly of the two parts 60 and 180. Groove 188 has a cross-sectional shape that is of generally circular contour, but of an extent that is less than a semi-circle. In this way, more than a semi-circular portion of the circumference of seal 190 will protrude. This protrusion allows the o-ring seal to have two-line sealing contact with part 60 when the two parts 60 and 180 are assembled together. The two lines of sealing contact are indicated by the respective reference numerals 192 and 194 in FIG. 37. It can be seen that these two lines are against the bottom wall and the side wall surfaces that meet to form the corner that is confronted by the seal when the two parts 60, 180 are assembled.

Each wall 186A, 186B, 186C includes a shoulder 196 that is adapted to abut a corresponding portion of the top face of part 60 forming a margin surrounding each depression 76A, 76B, 76C before free end surface 198 of each wall 186A, 186B, 186C abuts the bottom surface of the corresponding depression 76A, 76B, 76C. In this way, proper sealing contact of each seal to the respective depression wall is best assured. It is also desirable that each wall and its depression be slightly vertically staggered from the others to facilitate the assembly causing the initial engagement of each seal with the corresponding depression to occur sequentially rather than contemporaneously. This minimizes the initial assembly force that is required.

Threaded inserts 200 that have been previously press-fitted into suitable holes in the top face of part 60, or else inserted molded into the part during the molding process, are available for acceptance of screws (not shown) that are passed through correspondingly aligned clearance holes in the upper manifold part to join the two parts 60, 180 together in assembly. It is to be noted that the configuration of part 180 prevents direct tool access to at least some of the bolt holes 132 so that it is not possible to preassemble the two parts 60 and 180 before their assembly to the engine. Now that details of the structure of the intake manifold/fuel rail of the invention have been presented, attention can be directed to a description of the method of fabricating the lower manifold part 60.

A number of the unique aspects of the invention relate to the method of molding lower manifold part 60. One of these involves the method of making the through-passages 74A-74F. That method will now be explained with reference to FIGS. 38 and 39.

Part 60 is fabricated by conventional molding technology in a mold that has been constructed in a particular way. The mold comprises a cavity within which the molding is conducted. The cavity is cooperatively defined by the closed position of several parts of the mold. The mold parts are operable to an open condition after solidification of the moldable material that had been injected to fill the cavity. When the mold is open, the part can be removed from the mold. The mold comprises a pair complementary and separably engaged core parts that are disposed within the mold cavity to cooperatively define and occupy a corresponding through-passage 74A-74F during the steps of introducing the moldable material into the cavity and allowing the material to solidify within the cavity. The two core parts of each pair are arranged for separation by relative movement away from each other in generally opposite but non-colinear directions. This is the key to being able to fabricate the molded part 60 in a cost-effective manner to create the required shapes for the through-passages 74A-74F. A representative pair of core parts is shown in FIGS. 38 and 39 for forming a particular passage.

The two core parts 202, 204 are shown in fully engaged position in FIG. 38. Comparison of this figure with FIG. 20 reveals that the two core parts cooperatively define a corresponding through-passage 74A-74F when they are in the fully engaged position of FIG. 38. During the process of separating the two core parts, as represented by FIG. 39, core part 202 is pulled in the direction of arrow 206 while core part 204 is pulled in the direction of arrow 208. It can be seen that the directions represented by the two arrows are generally opposite but not colinear, and not parallel either. As viewed in FIG. 38, the respective imaginary lines that include the respective arrows 206, 208 will intersect at some point, and at that intersection they will be found to be angularly related at a small acute angle represented by the numeral 210 in FIG. 39.

The two parts 202, 204 have respective surface portions 212, 214 that slide across each other during separation. These surfaces are flat and may be considered to define what is referred to as the parting plane 215. As can be seen from consideration of FIG. 39, it is the core part 204 that is pulled first in the direction of arrow 208 so that it clears part 202 before the latter is pulled in the direction 206. Core part 202 comprises a proximal portion 216 that occupies the entirety of the upper axial end portion of the particular through-passage. The entirety of the remainder of the through-passage is conjointly occupied by another portion 218 of the same core part and the entirety of the other core part. Moreover, core part 202 is shaped so that a portion of it occupies the entire length of the through-passage as measured along one particular circumferential zone 220 of the air passage. Another portion of the first core part and another portion of the other core part conjointly occupy the entire length of the through-passage as measured along another particular circumferential zone 222.

The mold that is used to fabricate part 60 also comprises core pins for fabricating the injector sockets, the bolt holes, the pressure regulator socket, and the various holes that are used to attach the injector retaining clips, the pressure regulator retaining clips, and the two brackets at the ends of the part. Since the axes of the sockets, the bolt holes, and the screw-receiving holes that extend into part 60 from upper side face portion 66A are all parallel, the core pins that are used to create these holes can be actuated by a common slide so that they are caused to move in unison. Similarly the other fuel injector sockets, bolt holes, screw-receiving holes and pressure regulator socket can be actuated by a common slide for motion in unison. The core parts 202 can be moved by one slide and the core parts 204 by an opposite slide. Accordingly, a very efficient mold is the result.

Since bolt holes 132 are in fact through-holes, they can be molded by advancing oppositely arranged core pins toward each other until the tip ends of the core pins are in abutment.

Since the fuel passageway holes 82, 84, 86 are all through-holes, they too may be individually molded by means of two core pins that are advanced from opposite directions into abutment and that are retracted after the moldable material has solidified in the cavity. The manner in which the transverse through-hole 86 intercepts the longitudinal through-holes 82, 84 enables all three of these through-holes to be formed during the molding process.

The disclosure that has been made shows the invention to comprise numerous unique aspects. While a presently preferred embodiment has been illustrated and described, it should be appreciated that principles of the invention may be practiced in other equivalent ways.

What is claimed is:

1. An engine part comprising a fuel rail comprising two banks of injector-receiving sockets respectively disposed on opposite lateral sides of the part, a first fuel passageway hole extending longitudinally in said part rail and serving one of said banks of sockets, a second fuel passageway hole extending longitudinally in said part rail and serving the other of said banks of sockets, wherein the sockets of said each of said banks have their respective axes inclining downwardly and laterally inwardly so that the sockets' sidewalls are similarly inclining, each of said first and second fuel passageway holes intercepts the sidewalls of the sockets of the particular bank which it serves, each of said first and second fuel passageway holes being disposed laterally in the engine part to intercept the sidewalls of the sockets which it serves at a region of each socket's sidewall that is disposed in the fuel rail laterally inwardly of an imaginary plane that passes through the socket's axis in the same direction as that along which the corresponding one of said first and second fuel passageway holes intercepts the socket, wherein the axes of the sockets served by said first fuel passageway hole are mutually parallel, the axes of the sockets served by said second fuel passageway hole are mutually parallel, and further including bolt holes extending through said fuel rail to provide for the attachment of the fuel rail to an engine by fasteners passing through the bolt holes, certain ones of said bolt holes having their axes parallel to the axes of the sockets served by said first fuel passageway hole, certain others of said bolt holes having their axes parallel to the axes of the sockets served by said second fuel passageway hole, and each of said first and second fuel passageway holes being straight and when viewed axially being disposed in the fuel rail between the sockets which it serves and the bolt holes whose axes are parallel with the sockets which it serves.

2. An internal combustion engine having a part comprising a fuel rail serving a bank of several combustion cylinders, said part comprising sockets for fuel injectors, a socket for a pressure regulator, and bolt holes for bolts to attach the part to the engine characterized in that axes of said sockets and the axes of said bolt holes are mutually parallel and open at an exterior surface of the part, in which the engine has a second bank of cylinders and said part has additional fuel injector sockets and additional bolt holes, the axes of said additional sockets and additional bolt holes being mutually parallel and open at another exterior surface of the part and non-parallel with the axes of the first-mentioned socket and bolt holes.

* * * * *